United States Patent [19]

Hazelton et al.

[11] Patent Number: 4,607,074

[45] Date of Patent: Aug. 19, 1986

[54] DYNAMICALLY CURED THERMOPLASTIC OLEFIN POLYMERS

[75] Inventors: Donald R. Hazelton, Chatham; Robert C. Puydak, Cranbury, both of N.J.; D. A. Booth, Overijse, Belgium

[73] Assignee: Exxon Research & Engineering Co., Florham Park, N.J.

[21] Appl. No.: 629,635

[22] Filed: Jul. 11, 1984

[51] Int. Cl.$^4$ .................. C08L 11/00; C08L 15/02; C08L 23/26

[52] U.S. Cl. .................. 524/425; 524/525; 524/526; 524/528; 524/519; 524/445; 525/192; 525/193; 525/194; 525/195; 525/196; 525/211; 525/215; 525/232; 525/237; 525/240; 525/197

[58] Field of Search .................. 525/192–194, 525/211, 240, 232, 215, 196; 524/519, 425

[56] References Cited

U.S. PATENT DOCUMENTS

| | | | |
|---|---|---|---|
| 3,037,954 | 6/1962 | Gessler et al. | 525/141 |
| 3,592,881 | 7/1971 | Ostapchenko | 525/232 |
| 3,904,470 | 9/1975 | Fukuki et al. | 525/240 |
| 4,087,485 | 5/1978 | Huff | 525/240 |
| 4,104,210 | 8/1978 | Coran et al. | 525/232 |
| 4,130,534 | 12/1978 | Coran et al. | 525/232 |
| 4,202,801 | 5/1980 | Peterson | 525/232 |
| 4,212,787 | 7/1980 | Matsuda et al. | 525/232 |
| 4,348,266 | 9/1982 | Coran et al. | 204/159.2 |
| 4,350,795 | 9/1982 | Bohm et al. | 525/194 |
| 4,464,500 | 8/1984 | Diamond et al. | 525/211 |

FOREIGN PATENT DOCUMENTS 8145741 8/1983 Japan .................. 525/240

*Primary Examiner*—Carman J. Seccuro
*Attorney, Agent, or Firm*—H. L. Cohen

[57] ABSTRACT

Thermoplastic compositions of matter useful as gasketing materials as well as flexible boots and seals which are soft, have low compression set and high tensile. The compositions comprise a polyolefin resin and at least two different rubbers, one of which is vulcanized to a fully cured state by a cure system which leaves the other rubber(s) unvulcanized. The preferred embodiment comprises a blend of polypropylene and ethylene vinylacetate as the polyolefin resin component, EPDM as the uncured rubber component and a ZnO cured halogenated butyl rubber. In another embodiment of the invention, the resin is excluded and the uncured rubber is a high crystallinity EPDM.

49 Claims, No Drawings

DYNAMICALLY CURED THERMOPLASTIC OLEFIN POLYMERS

BACKGROUND OF THE INVENTION

In recent years there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessibility of thermoplastic resins. The elastomeric characteristics are enhanced if one component of the blend is a vulcanizable elastomer which is wholly or partially crosslinked.

The earliest work in the curing of TPO compositions area was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler, '954 discloses compositions comprising polypropylene and a rubber wherein the rubber can be, inter alia, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. No. 3,758,643 and 3,806,558 disclose TPO type polymers comprising an olefin resin and olefin copolymer rubber wherein the rubber is dynamically cured to a partial cure state. These compositions are reprocessible and result in molded products having good surface appearance. However, the potential applications of these products is limited because of high compression set and/or low softening temperatures resulting from only a partial cure of the rubber. Furthermore, the partial peroxide cure utilized is difficult to control from the standpoint of completeness of reaction, resulting in batch to batch variations in product properties.

U.S. Pat. No. 4,130,534 discloses TPO blends which comprise a polyolefin resin and a butyl rubber wherein the blend comprises up to 60 wt% of polyolefin resin and 40 wt% or more of a rubber. The butyl rubbers which can be utilized include butyl rubber per se as well as chlorinated or brominated butyl rubber. In the preferred embodiment, the polyolefin resin comprises 20 to 45 wt% of the blend and the rubber comprises about 80 to 55 wt% of the blend. The rubber is said to be fully cured, the cure being a dynamic vulcanization.

U.S. Pat. No. 4,130,535 discloses TPO compositions wherein the rubber component is an ethylene propylene copolymer ("EPM") or terpolymer ("EPDM"). The preferred thermoplastic polyolefin resins are polypropylene and polyethylene. The compositions comprise about 75 to about 25 wt% polyolefin resin and about 25 to about 75 wt% rubber. The rubber is dynamically cured to a fully cured state. Similar compositions are disclosed in U.S. Pat. No. 4,311,628 wherein the cure system for the rubber is a metal activated haloresin cure, e.g., brominated dimethylol phenol resins.

These TPO systems wherein the rubber is fully cured have the disadvantage that, as a result of poor flow characteristics, injection molded components made from these TPO's exhibit "flow line" imperfections. As a consequence special mold designs are required to minimize the problem, especially for large parts. Applications are further limited because of the high Shore A hardness of the composition.

U.S. Pat. No. 4,409,365 discloses TPO compositions in which a polyolefin resin is combined with an EPDM and a nitrile rubber. The rubbers are vulcanized and the product is said to have improved oil resistance.

U.S. Pat. No. 3,081,279 discloses compositions wherein a rubber such as butyl rubber is combined with a sulfochlorinated polyolefin resin and cured. The uncured blend is said to have improved processing characteristics.

U.S. Pat. No. 2,369,471 disclosed blends of ethylene polymers with various hydrocarbon rubbers and halogenated rubbers. The compositions are either uncured or compression molded vulcanizates.

U.S. Pat. No. 4,302,557 discloses a shrink film which comprises an EPM or EPDM rubber and a low density polyethylene of soft ethylene copolymer such as ethylene vinylacetate. Alternatively, the polymer blends can include polypropylene or high density polyethylene (HDPE). Another variant of the disclosed composition comprises the ethylene copolymer rubber with the polypropylene or HDPE. The rubber can be unvulcanized or, in the alternative a film of the blend is prepared and radiation cross-linked to form a heat shrinkable film.

U.S. Pat. No. 4,212,787 discloses a combination of a peroxide curable rubber and a peroxide decomposible polyolefin resin which may, alternatively have incorporated therein a non-peroxide curable rubber such as polyisobutylene. The peroxide curable rubber is preferably an ethylene propylene rubber (EPR) and the peroxide decomposible polymer is preferably polypropylene. The curable rubber is partially cured in the manner of U.S. Pat. No. 3,866,558, supra. The partial curing can be carried out in the presence of divinyl benzene. The product is said to have improved flexibility and rebound elasticity. The compositions comprise about 100 to 5 parts by weight of a partially cured elastomer which is prepared by the dynamic heat treatment in the presence of a peroxide of a mixture of 100 to 40 parts by weight of (a) peroxide-curable olefin copolymer rubber and 0 to 60 parts by weight of (b) a peroxide-decomposible olefin plastic; and 5 to 100 parts of at least one (c) peroxide non-curable hydrocarbon rubber.

Other TPO compositions have been prepared utilizing a thermoplastic polyolefin resin in conjunction with a rubber. U.S. Pat. No. 4,104,210 discloses compositions wherein the rubber is a diolefin rubber, e.g., natural rubber, polyisoprene, nitrile rubber or styrene butadiene rubber. The rubber is fully cured. U.S. Pat. No. 4,211,049 discloses particular curatives for the TPO compositions containing diolefin rubbers, e.g., phenolic curatives, urethane curatives and certain sulfur donor curatives. U.S. Pat. No. 4,141,878 discloses TPO compositions wherein the rubber is cross-linked chlorosulfonated polyethylene.

The TPO compositions of the prior art are either compositions in which the rubber component is uncured or partially cured and have low tensile strength and high compression set or are compositions containing a fully cured rubber portion and consequently are high in hardness and have poor flow characteristics when injection molded, resulting in flow lines in the finished product.

SUMMARY OF THE INVENTION

It has surprisingly been found that a TPO having good physical strength characteristics coupled with excellent processibility, low hardness and low compression set can be prepared from a blend of a thermoplastic olefin resin and two rubber components, only one of which is fully cured. The unexpected result is achieved by selecting rubbers which can be dynamically cured using a curative which vulcanizes only one of the rubbers. For example, one of the rubbers can be an EPDM and the other can be a halogenated butyl rubber. Where a ZnO cure is used only the halogenated butyl rubber is cured; the EPDM remains unvulcanized.

By selecting polypropylene or high density polyethylene as the thermoplastic olefin resin the compositions exhibit good high temperature properties. The compositions of this invention, because of their increased tensile, low Shore A hardness and low compression set are useful as molded and extruded articles such as gasketing materials, boot seals, tubing, hosing, etc.

DETAILED DESCRIPTION

This invention relates to improved TPO composition. In particular it relates to compositions of a polyolefin resin and two rubbers one of which can be cured by a cure system which leaves the other rubber in the uncured state. The vulcanization of the rubber is accomplished by dynamic vulcanization.

As used in the specification and claims, the term "dynamic vulcanization" means a vulcanization process for a rubber-containing TPO composition wherein the rubber is vulcanized under conditions of high shear. As a result, the rubber is simultaneously crosslinked and dispersed as fine particles of a "micro-gel" within a polyolefin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) as used in the specification and claims means a composition comprising a thermoplastic polyolefin resin and a rubber wherein at least a part of the rubber has been dynamically vulcanized to a fully cured state. The compositions are generally prepared by blending together the polyolefin resin and rubber with curatives and fillers under conditions of dynamic vulcanization.

In preparing the preferred DVA compositions of this invention at least one polyolefin resin is blended with at least two rubbers at least one of which can be vulcanized by a cure system which leaves the other unvulcanized. The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), linear low density polyethylene (LLDPE) and polybutylene (PB), as well as copolymers of ethylene with vinylacetate, acrylic acid, methyl acrylate, ethyl acrylate, etc. However, these other polyolefin resins can be incorporated into the DVA compositions of this invention along with the polypropylene ("PP") or polyethylene ("PE"). A preferred composition includes PP and ethylene-vinylacetate copolymer ("EVA") as the polyolefin resin component. As used in the specification and claims, the term "polypropylene" includes homopolymers of propylene as well as reactor copolymers of polypropylene (RCPP) which can contain about 1 to about 20 wt% ethylene or an alpha olefin comonomer of 4 to 16 carbon atoms. The polypropylene can be highly crystalline isotactic or syndiotactic polypropylene. The RCP can be either a random or block copolymer. The density of the PP or RCPP can be about 0.80 to about 0.91 g/cc.

High density polyethylene (HDPE), useful as the polyolefin resin of this invention, has a density of about 0.941 to about 0.965 g/cc. High density polyethylene is an established product of commerce and it manufacture and general properties are well known to the art. Typically, HDPE has a relatively broad molecular weight distribution, characterized by the ratio of weight average molecular weight to number average molecular weight of from about 20 to about 40.

Polyolefin resins which can optionally be included in the compositions of this invention include polybutylene, LDPE and LLDPE as well as copolymers of ethylene with unsaturated esters of lower carboxcylic acids. The term "polybutylene" generally refers to thermoplastic resins of both poly (1-butene) homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims means both low and medium density polyethylene having densities of about 0.910 to about 0.940 g/cc. The terms include linear polyethylene as well as copolymers of ethylene which are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

Polyethylene copolymers suitable as the polyolefin resins of this invention include copolymers of ethylene with unsaturated esters of lower carboxcylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 97 wt% ethylene, preferably about 70 to 95 wt% ethylene, more preferably about 75 to about 90 wt% ethylene. The expression "ethylene copolymer resin" as used in the specification and claims means, generally, copolymers of ethylene with unsaturated esters of lower ($C_1$–$C_4$) monocarboxylic acids and the acids themselves; e.g., acrylic acid, vinyl esters or alkyl acrylates, while the expression "EVA" means, specifically, ethylene-vinylacetate copolymers. Illustrative of the acrylates which can be utilized are methyl acrylate and ethyl acrylate.

The rubbers which can be used in the practice of this invention include both synthetic and natural rubbers; at least one of the rubbers utilized must be vulcanizable. Illustrative, non-limiting examples of rubbers suitable for use in the practice of this invention include butyl rubber, halogenated butyl rubber, ethylene propylene rubber (EPM), ethylene-propylenediene rubber (EPDM), polyisoprene, polychloroprene, styrene-butadiene rubber, polybutene copolymers, nitrile rubbers, chlorosulfonated polyethylene, etc. While polyisobutylene (PIB) is not a true rubber because it cannot be vulcanized, it can be utilized in the practice of this invention provided that the PIB has a viscosity average molecular weight of about 40,000 to about one million.

The term "rubber" as used in the specification and claims means any natural or synthetic polymer which can be vulcanized or cured so as to exhibit elastomeric properties. For the purpose of this invention, PIB is considered a rubber although it cannot be vulcanized.

The terms EPM and EPDM are used in the sense of their ASTM designations. EPM is an ethylene-propylene copolymer which can be cross-linked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tehahydroindene, methyltetrahydroindene, dicyclopentadiene; 5-isopropylidene-2-norbornene; 5-vinyl-norbornene, etc.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20-50 wt% acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book,* 1980 Edition, Materials and Compounding Ingredients for Rubber, pages 386-406.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85-99.5 wt% (preferably 95-99.5 wt%) of a $C_4$-$C_7$ isoolefin, such as isobutylene, and about 15-0.5 wt% (preferably about 5-0.5 wt%) of a multiolefin of about 4-14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608-609, etc. The term "butyl rubber" as used in the specification and claims includes the aforementioned copolymers of an isoolefin having 4-7 carbon atoms and about 0.5 to 20 wt% of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and percipitates out of solution as fine particles. The polymerization is generally carried out at temperatures of about $-90°$ C. to $-100°$ C. See. U.S. Pat. Nos. 2,356,128 and 2,356,129 incorporated herein by reference.

The polymerization process which is carried out in a draft tube reactor is continuous. Monomer feed and catalyst are continuously introduced at bottom of the draft tube where an axial flow pump is located. The pump circulates the slurry at high velocity to provide efficient mixing and heat transfer. Polymer slurry containing about 20-30 wt% butyl rubber continuously overflows from the reactor through a transfer line.

Where the desired product is the butyl rubber itself, the slurry is fed through the transfer line to a flash drum operated at about 140-180 kPa (1.38-1.58 atm) and 65°-75° C. Steam and hot water are mixed with the slurry in a nozzle as it enters the drum to vaporize methyl chloride and unreacted monomers which pass overhead and are recovered, and the polymer is finished by water removal and drying. Where, however, it is desired to produce a halogenated butyl rubber, this can be accomplished by preparing a solution of the rubber. Of course, any halogenation technique may be utilized.

In the preferred method of halogenation a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The polyolefin resin component of the DVA composition of this invention comprises about 25 to about 100 wt% of polypropylene or high density polyethylene; preferably about 35 to about 100 wt% PP or HDPE; more preferably about 45 to about 100 wt%, e.g., 45 to about 90 wt%. While blends of PP or HDPE may be used, each of these polymers are selected for their high temperature properties and no particular advantage is seen in blends thereof. The optional aforedescribed polyolefin resins which can be blended with the PP or HDPE comprise about 0 to 75 wt% of the polyolefin resin component of the DVA; preferably about 10 to about 55 wt%; more preferably about 15 to about 35 wt% of the polyolefin resin component is the optional polyolefin resin.

The DVA compositions of this invention preferably comprise a polyolefin resin and a blend of two or more rubbers, at least one of which can be cured by dynamic vulcanization with a cure system that leaves the remaining rubber in the uncured state. While generally, polyolefin resin is included in the composition it is within the scope of this invention to prepare DVA compositions which contain little or no PP or HDPE. However, where the PP or HDPE comprise less than 10 wt% of the DVA composition, at least one of the elastomers must be a high crystallinity EPDM having a crystallinity, as measured by x-ray diffraction of at least 2 wt%. The PP or HDPE can comprise 0–60 wt% of the polymer component (polyolefin resin plus elastomers); preferably about 10 to about 60 wt%; more preferably about 10 to about 45 wt%, e.g., about 12 to about 35 wt%. The rubber which is to be cured can comprise about 6 to about 85 wt% of the polymer component of the DVA; preferably about 10 to about 80 wt%; more preferably about 15 to about 70 wt% of the polymer component. The third component of the polymer component of the DVA is the uncured rubber which comprises the balance of polymer component. This uncured rubber can comprise 5 to about 80 wt% of the polymer component of the DVA; preferably about 6–73 wt%; more preferably about 20 to about 55 wt% of the polymer component. Where the PP or HDPE resin component of DVA is less than 10 wt% of the polymer component of the DVA, the uncured rubber component of the DVA blend is a high crystallinity EPDM having a crystallinity of at least 2 wt% as measured by x-ray diffraction; preferably at least 8 wt%, and comprises about 5 to about 80 wt% of the DVA composition; preferably about 10–55 wt%; more preferably about 12 to about 40 wt%, the balance of the polymer component of the composition being fully cured rubber.

In addition to its polymer component, the DVA composition of this invention can include fillers, antioxidants, stabilizers, rubber processing oils, lubricants (e.g., oleamide), antiblocking agents, waxes, foaming agents, pigments, coupling agents for the fillers and other processing aids known to the rubber compounding art. The pigments and fillers can comprise up to 50 wt% of the total DVA composition based on polymer component plus additives.

Fillers can be inorganic fillers such as calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, both vulcanized and unvulcanized, and can be defined as the ratio, by weight, of process oil to the rubber in the DVA which is to be dynamically vulcanized. This ratio can vary from about 0 to about 2.0/1; preferably about 0.3/1 to about 1/1; more preferably about 0.5/1 to about 0.75/1. Larger amounts of process oil can be used, the deficit being reduced physical strength of the composition. Oils other than petroleum based oils such as oils derived from coal tar and pine tar can also be utilized. In addition to the petroleum derived rubber process oils, organic esters and other synthetic plasticizers can be used.

Antioxidants can be utilized in the composition of this invention—the particular antioxidant utilized will depend on the rubbers utilized and more than one type may be required. Their proper selection is well within the skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

Any conventional cure system for the rubber to be dynamically vulcanized can be used except that peroxide cures are specifically excluded from the practice of this invention. Under conditions which would result in a fully cured rubber using peroxide, the polypropylene resin would depolymerize, thereby resulting in a lower strength composition having little temperature resistance. Otherwise, any particular curatives known in the art for the vulcanization of rubbers are suitable. These include sulfur cures as well as non-sulfur cures. For example, halogenated butyl rubber can be cured using zinc oxide alone. Of course, accelerators such as dithiocarbamates, thiurams, diamines and thioureas can be included in these zinc oxide cures. Zinc oxide free cures of halogenated butyl rubber known to the art can be utilized. For example, one such vulcanizing system comprises litharge, 2-mercaptoimidazoline and diphenyl guanidine.

Resins cures can be used for butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

While phenolic resin cures are suitable cures, they impart a yellowish or orangish tinge to the rubber part. For halogenated butyl rubber a preferred cure is one based on ZnO and/or MgO. Such cures permit the use of pigments such as $TiO_2$ to give bright white compositions. In the cure system, the MgO acts not as an accelerator but as an acid acceptor to stabilize the rubber from dehalogenation.

Any combination of rubbers can be used, the only requirement being that, preferably, one of the rubbers selected can be dynamically vulcanized using a cure system which will not vulcanize the other rubber. Halogenated butyl rubbers and polychloroprene can be vulcanized using zinc oxide. Hence, these rubbers can be used advantageously in combination with any rubber which requires sulfur or another curative to vulcanize it and will not cure with a zinc oxide cure system. Such rubbers include polyisoprene, natural rubber, EPM, EPDM, styrene-butadiene rubber, butyl rubber, etc. EPM is generally radiation cured or peroxide cured and is unaffected by sulfur cure systems. It therefore can be used with rubbers utilizing a sulfur curative or resin cure system in the dynamic vulcanization step. Since polyisobutylene cannot be vulcanized with known techniques, it can be utilized as the uncured rubber phase regardless of the type of cure system used for the other rubber.

In a preferred embodiment, the rubber to be vulcanized is chlorinated or brominated butyl rubber. Halogenated butyl rubbers are vulcanized with zinc oxide cures. Sulfur-bearing accelerators can be utilized with the zinc oxide. This accelerator will generally not vulcanize sulfur curable rubbers such as EPDM when used at the low levels necessary to cure halogenated butyl rubber.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thiuram tetrasulfide ethylene trithiocarbonate; 2-mercapto-benzothiazole; benzothiazole disulfide; N-phenyl-beta-naphtlylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises MgO, ZnO and zinc diethyldithiocarbamate since this system results in a vulcanized rubber with low compression set.

In the practice of this invention the polyolefin resin and rubbers are mixed together at a temperature sufficient to soften the resin or, more commonly, at a temperature above its melting point where the resin is crystalline at room temperature, e.g., PP. After the resin and rubbers are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 130° C. in the case of HDPE and about 165° C. in the case of PP) to about 250° C.; more typically, the temperature range is about 150° C. to about 230° C. Preferably the vulcanization is carried out at a temperature of about 180° C. to about 220° C.

It is preferred that the mixing process must be continued until vulcanization is complete. If vulcanization is permitted to continue after mixing has stopped, the composition will not be reprocessible as a thermoplastic. However, the dynamic vulcanization can be carried out in stages. For example, vulcanization can be commenced in a twin screw extruder and pellets formed of the DVA material using an underwater pelletizer thereby quenching the vulcanization before it is complete. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components are present in the mix prior to carrying out the dynamic vulcanization process of this invention, this is not a necessary condition. For example, in one embodiment, only the rubbers need be mixed thoroughly, followed by dynamic vulcanization in the absence of polyolefin resin. After vulcanization is complete, the dynamically vulcanized blend of rubbers can be let down into a polyolefin resin to prepare the compositions of this invention.

In another embodiment the rubber to be cured can be dynamically vulcanized in the presence of some or all of the polyolefin resin. This blend can then be let down into the uncured rubber or uncured rubber and additional polyolefin resin.

While in the preferred embodiment of this invention two or more rubbers are utilized, at least one of which is vulcanized by a cure system which does not vulcanize the other rubbers, the same rubber can be used for both the cured and uncured rubber. For example, the polyolefin resin can be blended with halogenated butyl rubber and the rubber vulcanized using just sufficient ZnO to fully cure the rubber. Additional halogenated butyl rubber can then be added as the uncured rubber phase. After complete mixing the blend comprises a resin, an uncured rubber and a fully cured rubber and is within the scope of this invention. Similarly, a sulfur curable EPDM can be utilized as the fully cured phase and dynamically vulcanized in the presence of the resin using just sufficient curative to vulcanize the EPDM. Subsequently, an uncured EPDM can be added to form the DVA compositions of this invention.

In a variant of this invention a rubber, for example halogenated butyl rubber, is dynamically vulcanized in the presence of the resin using a slight excess of curative, the dynamic vulcanization being carried out until the rubber is fully vulcanized. Subsequently, additional uncured rubber, vulcanizable by the same cure system, is added under dynamic vulcanization conditions. The result is a modified DVA blend comprising a resin, a fully cured rubber and a partially cured rubber. This modified DVA will have properties intermediate to the earlier described DVA and the prior art TPO where the rubber is fully cured.

The term "fully vulcanized" as used in the specifications and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component of the blends to the extent that it contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferredly $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech*, 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term v is multiplied by the gel fraction (%gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises polypropylene as the polyolefin resin, an EPDM as a first rubber and as a second rubber, chlorinated butyl rubber. The chlorinated butyl rubber is dynamically vulcanized utilizing a ZnO cure system which does not effect a cure of the EPDM or PP. In a similar composition, the EPDM can be replaced by an unhalogenated butyl rubber.

The advantages of this invention may be more readily appreciated by reference to the following examples.

EXAMPLE I

DVA blends of this invention were prepared incorporating ethylene vinylacetate into the composition along with polypropylene as the polyolefin resin. The results are shown in Table I. All component preparations are parts by weight. The compositions were prepared by blending together all of the components, exclusive of the vulcanizing agents, in an internal mixer at a temperature of about 160°-190° C. After mixing was complete the vulcanizing agents were added and mixing continued for about 3-4 minutes and test specimens prepared from each composition. Run #1 represents a traditional polyolefin/uncured rubber type TPO. This composition is compared with compositions having incorporated therein a dynamically cured chlorinated butyl rubber in addition to uncured EPDM. Those compositions (Runs #2, 3 and 4 of Table I) demonstrate the advantages of the DVA of this invention and have increased modulus, lower compression set and lower tension set as well as increased VICAT softening temperature. Consequently, the DVA of this invention has application where more elastic rubber properties and higher temperature resistance are required.

EXAMPLE II

The experiments of Example I were repeated varying the quantity of chlorinated butyl rubber as well as the vulcanizing agent. The results are shown in Table II.

Run #1 is a TPO composition of the prior art where the rubber is uncured. Run #2 is a comparison in which the chlorobutyl rubber, but not the EPDM, is cured. As can be seen from the data, this DVA has lower compression set, higher tensile strength, higher modulus and lower tension set. Run 3 is similar to Run 2 but includes 20 parts by weight of chlorobutyl rubber instead of 10 parts. The properties of the DVA are further improved by incorporation of a larger amount of cured rubber. The curative was added from a master batch which included an uncured EPM as a binder for the active ingredients.

EXAMPLE III

The experiments of Example II were repeated with a comparison of the substitution of bromobutyl rubber for chlorobutyl rubber. The bromobutyl rubber exhibited better compression set resistance, particularly at high temperatures. The results are shown in Table III. It is apparent that both chloro and bromobutyl rubber can be used as the cured rubber component of this invention.

EXAMPLE IV

TPO compositions were prepared where the EPDM component was a high crystallinity, high ethylene EPDM. The results are shown in Table IV.

The compositions of this example were prepared by blending in a 25 lb. Banbury mixer. Dynamic vulcanization was carried out in the blender by adding a ZnO/ZDEDC curative system to the blended composition and extending the blend cycle sufficiently to fully cure the chlorinated butyl rubber where used. The compositions were pelletized using an underwater pelletizer.

The blends of Runs 1 and 2 contain differing proportions of EPDM and chlorobutyl rubber in which the rubber is unvulcanized. The blends of Runs 3 and 4 are identical to Runs 1 and 2, respectively, but include curative for the chlorobutyl rubber. These blends (3 and 4) are the DVA compositions of this invention.

Test specimens were injection molded. Additionally, blown film was prepared using a 1½ extruder line with a three inch die having a 30 mil die gap. While the vulcanized blends of Run 3 could be blown into film, the higher cured rubber content of the blend of Run 4 prevented it from being blown into film. The composition does have utility in other applications, e.g., injection molded parts. It should be noted that the EPDM used has a high crystallinity and hence imparts good physical properties even to the uncured blends.

EXAMPLE V

A DVA within the scope of this invention was prepared which includes no polyolefin resin. One of the rubbers (EPDM) is a high crystallinity EPDM and is uncured. The vulcanized rubber component is chlorobutyl rubber. The DVA composition possessed a low durometer (Shore A), low set at break and, surprisingly, very good compression set resistance which is typical of a fully cured rubber composition even though about 60% of the rubber was uncured. The results are shown in Table V.

This DVA composition can be used as prepared or can be let down into polypropylene to give a high tensile strength DVA with high temperature resistance.

EXAMPLE VI

A TPO composition was prepared where the unvulcanized rubber phase was butyl rubber and the cured rubber was chlorobutyl rubber. Samples were injection molded. The mixing procedure and results are shown in Table VI. The DVA is characterized by low hardness, good tensile strength and low compression set.

EXAMPLE VII

Blends of chlorobutyl rubber and a high crystallinity EPDM were compared in the cured and uncured state. The DVA composition wherein the chlorobutyl was uncured had a tacky surface feel while the composition where the chlorobutyl was cured had a dry feel and lower mold shrinkage. A comparison blend was prepared where 20 wt% polypropylene was included in the composition and the chlorobutyl was cured. The sample containing the polypropylene had a higher compression set and higher hardness. On the other hand, it did not exhibit any mold shrinkage as did the other sample. The results are shown in Table VII.

TABLE I

| SOFT TPO COMPOUNDS | | | | |
|---|---|---|---|---|
| RUN# | 1 | 2 | 3 | 4 |
| EPDM[1] (Vistalon 3666) | 70 | 65 | 60 | 55 |
| Chlorobutyl 1066 | — | 4.58 | 9.17 | 13.78 |
| Polypropylene (GYM 45) | 10 | 10 | 10 | 10 |
| EVA (20% VA) | 10 | 10 | 10 | 10 |
| EVA (14% VA) | 10 | 10 | 10 | 10 |
| Titanium Dioxide | 1 | 1 | 1 | 1 |
| Zinc Oxide | — | 0.23 | 0.46 | 0.68 |
| Stearic Acid | — | 0.09 | 0.18 | 0.29 |
| Maglite D (MgO) | — | 0.02 | 0.05 | 0.07 |
| ZDEDC | 0 | 0.07 | 0.14 | 0.21 |
| MFR(5 kg @ 230° C.), dg/min | 9.0 | 5.5 | 1.5 | 1.1 |
| Hardness, Shore A, 15 sec. | 47 | 54 | 53 | 55 |
| 100% Modulus, MPa | 1.21 | 1.73 | 1.93 | 1.81 |
| 500% Modulus, MPa | 1.83 | 2.63 | 3.10 | 2.92 |
| Tensile, MPa | 4.73 | 4.10 | 4.15 | 4.39 |
| Elongation, % | 1000 | 660 | 755 | 675 |
| COMPRESSION SET, % | | | | |
| 22 hrs 23° C. | 31.2 | 30.0 | 29.3 | 25.6 |
| 22 hrs 70° C. | 79.0 | 68.1 | 65.3 | 70.3 |
| 30 mins 120° C. | 47.2 | — | 29.4 | — |
| TENSION SET, % | | | | |
| 2 min 100%, 2 min relax | 15 | 15 | 12 | 13 |
| VICAT, SOFTENING POINT,[2] °C. | | | | |
| 1 kg | 27.4 | — | 28.2 | 57.2 |
| 200 gm | 53.8 | 59.2 | 68.0 | 64.3 |

[1]75 parts of oil per 100 parts of rubber
[2]ASTM D-1525

TABLE II

| EVA CONTAINING COMPOSITIONS | | | |
|---|---|---|---|
| RUN # | 1 | 2 | 3 |
| EPDM[1] (VISTALON 3666) | 60 | 60 | 50 |
| Chlorobutyl 1066 | 10 | 10 | 20 |
| Polypropylene (GYM 45) | 10 | 10 | 10 |
| Irganox B 215 | 0.1 | 0.1 | 0.1 |
| EVA (20% VA) | 10 | 10 | 10 |
| EVA (14% VA) | 10 | 10 | 10 |
| Stearic Acid | — | 0.3 | 0.6 |
| MB ZnO/ZDEDC[2] | — | 2.5 | 6.0 |
| MFR (5 kg @ 230C) dg/min | 6.4 | 2.2 | 1.8 |
| Shore A instantaneous/15 sec. | 62/50 | 64/51 | 67/54 |
| Tensile, MPa | 2.8 | 3.2 | 3.8 |
| Elongation, % | 662 | 583 | 472 |
| Modulus @ 100%, MPa | 1.7 | 1.8 | 2.2 |
| Modulus @ 300%, MPa | 2.2 | 2.6 | 3.3 |
| Tension Set, % | 22.5 | 16.0 | 15.0 |
| 2' at 100% Extension | | | |
| 2' Relax | | | |
| VICAT Softening Point (200 gm), °C. | 57.8 | 58.3 | 56.0 |
| Compression Set B, % | | | |
| 22 hrs 23° C. | 42 | 38 | 37 |
| 22 hrs 70° C. | 81 | 73 | 66 |
| 30 mins 120° C. (30 mins Relax) | 74 | 61 | 36 |

[1]75 parts oil per 100 parts EPDM
[2]MB ZnO/ZDEDC = 
Vistalon 404 (EPM) 40
Zinc Oxide 40
ZDEDC 20
    100

TABLE III

| EVA CONTAINING TPO COMPOSITIONS | | |
|---|---|---|
| RUN # | 1 | 2 |
| EPDM[1] (VISTALON 3666) | 60 | 60 |
| Chlorobutyl 1066 | 10 | — |
| Bromobutyl 2244 | — | 10 |
| Polypropylene (GYM 45) | 10 | 10 |
| Irganox B 215 | 0.1 | 0.1 |
| EVA (20% VA) | 10 | 10 |
| EVA (14% VA) | 10 | 10 |
| Stearic Acid | 0.3 | 0.3 |
| MB ZnO/ZDEDC[2] | 2.5 | 2.5 |
| MFR (5 kg @ 230° C.) dg/min | 2.2 | 1.5 |
| Shore A instantaneous/15 sec. | 64/51 | 64/50 |
| Tensile, MPa | 3.2 | 2.8 |

TABLE III-continued
EVA CONTAINING TPO COMPOSITIONS

| RUN # | 1 | 2 |
|---|---|---|
| Elongation, % | 583 | 577 |
| Modulus @ 100%, MPa | 1.8 | 1.8 |
| Modulus @ 300%, MPa | 2.6 | 2.4 |
| Tension Set, % | | |
| 2' at 100% Extension | | |
| 2' Relax | 16.0 | 17.5 |
| VICAT Softening Point (200 gm), °C | 58.3 | 62.4 |
| Compression Set B, % | | |
| 22 hrs 23° C. | 38 | 38 |
| 22 hrs 70° C. | 73 | 64 |
| 30 mins 120° C. | 61 | 18/20 |
| (30 mins Relax) | | |

¹75 parts oil per 100 parts EPDM
²MB ZnO/ZDEDC =

| | |
|---|---|
| Vistalon 404 (EPM) | 40 |
| Zinc Oxide | 40 |
| ZDEDC | 20 |
| | 100 |

TABLE IV
DVA - HIGH CRYSTALLINITY EPDM

| RUN NO. | 1 | 2 | 3 | 4 |
|---|---|---|---|---|
| Dypro 8813 (12 MFR) (PP) | 20 | 20 | 20 | 20 |
| Vistalon 1721 (EPDM) | 41.4 | 27.6 | 41.4 | 27.6 |
| Chlorobutyl 1065 | 27.6 | 41.4 | 27.6 | 41.4 |
| Flexon 766 Oil | 5 | 5 | 5 | 5 |
| Atomite | 3 | 3 | 3 | 3 |
| Titanox 2071 | 2 | 2 | 2 | 2 |
| Oleamide | 1 | 1 | 1 | 1 |
| Syloid 244 FP | 0.2 | 0.2 | 0.2 | 0.2 |
| Maglite D (MgO) | 0.4 | 0.6 | 0.4 | 0.6 |
| Irganox 1076 (Antioxidant) | 0.2 | 0.2 | 0.2 | 0.2 |
| Ultranox 626 (Antioxidant) | 0.1 | 0.1 | 0.1 | 0.1 |
| Zinc Oxide | — | — | 1.9 | 2.9 |
| MFR @ 230C, dg/min | 3.4 | 2.8 | 0.12 | 0.05 |
| Injection Molded Dumbbells | | | | |
| Hardness, Instantaneous | | | | |
| Shore A | 82 | 72 | 80 | 80 |
| Shore D | 22 | 17 | 25 | 22 |
| 100% Modulus, MPa | 8.39 | 7.10 | 9.45 | 10.62 |
| Tensile Strength, MPa | 8.41 | 7.10 | 9.45 | 10.62 |
| Ultimate Elongation, % | 125 | 145 | 130 | 110 |
| Set at Break, % | — | 40 | 25 | 30 |
| Compression Set B, % | | | | |
| 22 hrs @ 70° C. | 84 | 78 | 77 | 63 |
| Oven Aging, 1 wk @ 100° C. | | | | |
| Hardness Change, Shore A | −8 | −3 | −4 | −5 |
| Tensile Retention, % | 109 | 104 | 89 | 83 |
| Elongation Retention, % | 80 | 73 | 85 | 91 |

TABLE V
RESIN FREE DVA

| | |
|---|---|
| Vistalon 1721 (EPDM) | 51.8 |
| Chlorobutyl 1065 | 34.5 |
| Flexon 766 Oil | 6.25 |
| Atomite | 3.75 |
| Titanox 2071 | 2.5 |
| Oleamide | 1.25 |
| Syloid 244 FP | 0.25 |
| Irganox 1076 | 0.25 |
| Ultranox 626 | 0.13 |
| Maglite D (MgO) | 0.5 |
| Zinc Oxide | 2.4 |
| Injection Molded Dumbbells - ASTM Die C | |
| Hardness, Instantaneous | |
| Shore A | 66 |
| 100% Modulus, MPa | 4.62 |
| Tensile Strength, MPa | 4.21 |
| Ultimate Elongation, % | 185 |
| Set at Break, % | 50 |
| Compression Set B, Plied | |
| 22 hrs at 70° C., % | 32 |

TABLE VI
LOW HARDNESS CHLOROBUTYL/PPRC FORMULATION

| | |
|---|---|
| CHLOROBUTYL 1066 | 59.1 wt % |
| Exxon Butyl 077 | 9.1 |
| Dypro K222Z PPRC (1.5 MFR) | 14.5 |
| Flexon 815 Oil | 9.1 |
| Maglite D | 0.6 |
| Stearic Acid | 0.9 |
| Irganox 1010 | 0.1 |
| DSTDP | 0.2 |
| Zinc Oxide | 4.6 |
| ZDEDC | 1.8 |
| Mixing Procedure | |
| Step 1 - MB - Banbury 4 mins. dump @ 200° C. | |
| CHLOROBUTYL 1066 | 75 |
| Dypro K222Z | 16.6 |
| Flexon 815 Oil | 6 |
| Irganox 1010 | 0.15 |
| DLTDP | 0.25 |
| Stearic Acid | 1.1 |
| Step 2 - Final - Banbury 8 mins. dump @ 210° C. | |
| Underwater Pelletized | |
| Mix and bring to 149° C. | |
| MB | 77.7 |
| Butyl 077 | 9.1 |
| Dypro K222Z | 1.7 |
| Flexon 815 | 4.5 |
| Maglite D | 0.6 |
| Add and bring to cure temperature | |
| Zinc Oxide | 4.6 |
| ZDEDC | 1.8 |
| Properties - Injection Molding ⁽¹⁾ | |
| Hardness, Shore A, Instantaneous | 63 |
| Tensile Strength, MPa | 6.00 |
| Ultimate Elongation, % | 110 |
| Set at Break, % | 6 |
| Compression Set B, Plied | |
| 70 hrs. @ 70° C., % | 29 |
| 22 hrs. @ 100° C., % | 11 |
| 22 hrs. @ 125° C., % | 23 |

⁽¹⁾Barrel Temperature
Rear 225° C.
Middle 225° C.
Nozzle 265° C.
Mold Temperature 38° C.
Inject Time 12 sec
Hold Time 20 sec

TABLE VII
DYNAMICALLY-VULCANIZED FILM CONCENTRATE/TPO FORMULATIONS

| RUN # | 1 | 2 | 3 |
|---|---|---|---|
| VISTALON 1721 | 60 | 60 | 48 |
| CHLOROBUTYL 1065 | 40 | 40 | 32 |
| Dypro 9670B (PPRC) | — | — | 20 |
| Maglite D (MgO) | 0.2 | 0.2 | 0.2 |
| Irganox 1076 | 0.1 | 0.1 | 0.1 |
| Weston 619 (Antioxidant) | 0.2 | 0.2 | 0.2 |
| Zinc Oxide | — | 0.8 | 0.64 |
| ZDEDC | — | 1.2 | 0.96 |
| MFR, dg/min. @ 230° C. | 0.9 | No Flow | 0.1 |
| Injection Molded Specimens | | | |
| Hardness, Shore A | 70 | 67 | 78 |
| 100% Modulus, MPa | 2.79 | 5.00 | 6.59 |
| 300% Modulus, MPa | — | — | 8.31 |
| Tensile Strength, MPa | 5.10 | 5.10 | 8.41 |
| Elongation, % | 170 | 190 | 340 |
| Set @ Break, % | 39 | 33 | 124 |
| Compression Set B, % | | | |
| 22 Hrs. @ 100° C. | 51 | 57 | 74 |
| Relative Mold Shrinkage, % | 5 | 3 | 0 |
| Surface Condition | V. Tacky | Dry | — |

TABLE VIII
INGREDIENT LIST

| DESIGNATION | DESCRIPTION | SUPPLIER |
|---|---|---|
| CHLOROBUTYL 1066 | Chlorinated isoprene - isobutylene copolymer, 51–60 ML (1 = 8) 100° C. | Exxon Chemical Americas |
| ZDEDC | Zinc diethyl dithiocarbonate | Several |
| VISTALON 3666 | Oil extended EPDM, 75 parts of oil per 100 parts of rubber, 45 ML (1 = 8) 127° C., 59% $C_2=$, 5% unsaturation, narrow MWD | Exxon Chemical Americas |
| Irganox B-215 | ½ Blend Irganox 1010/Irgafos 168 antioxidant | Ciba Geigy |
| Irganox 1010 | Tetrakis (methylene 3,5-di-tert-butyl-4-hydroxyhydrocinnamate) methane | Ciba Geigy |
| Irgafos 168 | Tris (2,4-di-tert-butylphenyl) phosphite | Ciba Geigy |
| Bromobutyl 2244 | Brominated isoprene - isobutylene copolymer, 42–52 ML (1 + 8) 125° C. | Exxon Chemical Americas |
| Dypro 8813 | Homopolymer polypropylene, 12 MFR (Condition L), 0.905 g/cc density | Arco Chemical Co. |
| VISTALON 1721 | Ethylene propylene terpolymer, 15 ML (1 + 8) 127° C, 78% $C_2=$, 1% unsaturation, crystallinity approximately 20% | Exxon Chemical Americas |
| CHLOROBUTYL 1065 | Chlorinated isoprene - isobutylene copolymer, 40–50 ML (1 + 8) 100° C. | Exxon Chemical Americas |
| Flexon 766 | Napthenic process oil | Exxon Company USA |
| Atomite | Natural ground calcium carbonate, mean particle size 3 microns | Thompson, Weinman & Company |
| Titanox 2071 | Titanium dioxide | NL Indus., Inc. |
| Oleamide | Long chain fatty acid amide | Several |
| Syloid 244 FP | Micron-sized synthetic silica, 2.1 sp. gr. | W.R. Grace & Co. |
| Maglite D, K | Magnesium oxide | C.P. Hall, Merck Chemical Co. |
| Irganox 1076 | Octadecyl 3-(3',5'-di-tert-butyl-4'-hydroxyphenyl) propionate | Ciba Geigy |
| Ultranox 626 | Bis (2,4-di-t-butylphenyl) Pentarythritol Diphosphite | Borg-Warner Chemicals, Inc. |
| DSTDP | Distearyl thiodipropionate | W.R. Grace & Co. |
| Butyl 077 | Isoprene-Isobutylene copolymer, 43–52 ML (1 + 8) 125° C. | Exxon Chemical Americas |
| Dypro K222Z | Reactor copolymer polypropylene, 1.5 MFR (Condition L) | Arco Chem. Co. |
| Flexon 815 | Parafinnic process oil ASTMD-2226 Type 104B | Exxon Company USA |
| DLTDP | Dilauryl thiodipropionate | W.R. Grace & Co. |
| Dypro 9670B | Reactor copolymer polypropylene, 4.0 MFR (Condition L) | Arco Chem. Co. |
| Weston 619 | Distearyl Pentaerythritol diphosphite | Borg-Warner Chemical, Inc. |
| GYM 45 | Polypropylene having a nominal melt index of 15 (ASTM Condition L) | Imperial Chemical Industries |
| VISTALON 404 | Ethylene propylene copolymer, 26 ML (1 + 8) at 127° C., 40% $C_2=$ | Exxon Chemical Americas |

What is claimed is:

1. A thermoplastic composition comprising a polyolefin resin, a first rubber component selected from the group consisting of polyisobutylene, and ethylene propylene copolymer (EPM) and EPDM and a second rubber component selected from the group consisting of halogenated butyl rubber and polychoroprene, said second rubber component being cured utilizing a curative other than a peroxide, which is a vulcanizing agent for the second rubber but not for the first rubber, said second rubber being cured to a fully vulcanized state by dynamic vulcanization in the presence of the polyolefin resin and first rubber compound.

2. The composition according to claim 1 wherein the polyolefin resin is polypropylene or HDPE.

3. The composition according to claim 1 wherein the first rubber is an EPDM.

4. The composition according to claim 3 wherein the second rubber is a halogenated butyl rubber and the vulcanizing agent comprises ZnO.

5. The composition according to claim 4 wherein the halogenated butyl rubber is chlorinated butyl rubber or brominated butyl rubber.

6. The composition according to claim 5 wherein the vulcanizing agent is ZnO.

7. The composition according to claim 6 wherein a dialkyl dithio carbamate is included.

8. The composition according to claim 1 wherein an inorganic filler material is incorporated therein.

9. The composition according to claim 8 wherein the inorganic filler is calcium carbonate or clay.

10. The composition according to claim 1 wherein the first rubber is polyisobutylene or an ethylene-propylene rubber (EPM).

11. The composition according to claim 2 wherein the polypropylene or HDPE comprises about 25 to about 100 wt% of the resin component based on total polyolefin resin and an optional polyolefin resin selected from the group consisting of LDPE, LLDPE, polybutylene or an ethylene copolymer resin is included at about 0 to about 75 wt% based on total resin.

12. The composition according to claim 11 wherein the polypropylene or HDPE comprises about 45 to about 90 wt% of the resin component and the optional resin comprises about 10 to about 55 wt% of the resin component based on total resin.

13. The composition according to claim 2 wherein the polyolefin resin is polypropylene.

14. The composition according to claim 11 wherein the optional resin is an ethylene copolymer resin.

15. The composition according to claim 14 wherein the ethylene copolymer resin is an ethylene-vinylacetate copolymer.

16. The composition according to claim 2 wherein the polypropylene comprises less than 10 wt% of the composition and the first rubber is an EPDM having as crystallinity as measured by x-ray diffraction of at least 2 wt%.

17. The composition according to claim 16 wherein the EPDM has a crystallinity of at least 8 wt%.

18. The composition according to claim 15 wherein the ethylene-vinylacetate copolymer comprises about 3 to about 30 wt% vinylacetate.

19. The composition according to claim 1 wherein the polyolefin comprises about 10 to about 60 wt% of the composition based on resin plus rubber, the second rubber comprises about 6 to about 85 wt% of the composition based on resin plus rubber and the first rubber comprises about 5 to about 80 wt% of the composition based on the resin plus rubber.

20. The composition according to claim 19 wherein the polyolefin resin comprises about 10 to about 45 wt% of the composition based on resin plus rubber.

21. The composition according to claim 20 wherein the polyolefin resin comprises about 12 to about 35 wt% of the composition based on resin plus rubber.

22. The composition according to claim 19 wherein the second rubber comprises about 10 to about 80 wt% of the composition based on resin plus rubber.

23. The composition according to claim 19 wherein the second rubber comprises about 15 to about 70 wt% of the composition based on the resin plus rubber.

24. The composition according to claim 19 wherein the first rubber comprises about 6 to about 73 wt% of the composition based on the resin plus rubber.

25. The composition according to claim 19 wherein the first rubber comprises about 20 to about 55 wt% of the composition based on the resin plus rubber.

26. The composition according to claim 1 wherein a rubber process oil is incorporated into the composition.

27. The composition according to claim 26 wherein the oil is incorporated into the composition in an amount such that the weight ratio of oil to total rubber is about 0.3/1 to about 1/1.

28. A process for preparing a thermoplastic composition comprising a polyolefin resin and at least two different rubbers, at least one of said rubbers being vulcanizable by a vulcanizing agent other than a peroxide, which will vulcanize only one of said rubbers which comprises:
(a) intimately mixing the polyolefin resin with at least one first rubber selected from the group consisting of polyisobutylene, and ethylene propylene copolymer (EPM) and EPDM and at least one second rubber selected from the group consisting of halogenated butyl rubber and polychoroprene at a temperature above the softening point of the polyolefin resin;
(b) adding to the intimate mixture of resin and rubber a vulcanizing agent for at least one second rubber; and
(c) vulcanizing the second rubber by dynamic vulcanization for a time to fully vulcanize the second rubber.

29. The process according to claim 28 wherein the dynamic vulcanization is carried out at a temperature of about 120° C. to about 250° C.

30. The process according to claim 29 wherein the dynamic vulcanization is carried out at a temperature of about 180° C. to about 200° C.

31. The process according to claim 28 wherein the first rubber is polyisobutylene, and ethylene propylene copolymer (EPM) or an EPDM.

32. The process according to claim 28 wherein the second rubber is a halogenated butyl rubber or polychloroprene and the vulcanizing agent comprises zinc oxide.

33. The process according to claim 32 wherein the halogenated butyl rubber is chlorinated butyl rubber or brominated butyl rubber.

34. The process according to claim 32 wherein the vulcanizing agent includes an accelerator.

35. The process according to claim 29 wherein the accelerator is zinc alkyl dithiocarbamate.

36. The process according to claim 28 wherein the first rubber is polyisobulytene or an ethylene-propylene rubber (EPM).

37. A process for preparing a thermoplastic composition comprising a polyolefin resin and at least two rubbers, at least one of said rubbers being vulcanized by a vulcanizing agent other than a peroxide, which will vulcanize at least one of said rubbers leaving at least one of said rubbers in an unvulcanized state which comprises:
(a) intimately mixing the polyolefin resin with at least one first rubber selected from the group consisting of halogenated butyl rubber and polychoroprene at a temperature above the softening point of the polyolefin resin;
(b) adding to the intimate mixture of resin and rubber a vulcanizing agent for at least one first rubber;
(c) vulcanizing the rubber by dynamic vulcanization for a time sufficient to fully vulcanize the rubber; and
(d) blending into the dynamically vulcanized rubber-polyolefin resin composition at least one second rubber selected from the group consisting of polyisobutylene, and ethylene propylene copolymer (EPM) and EPDM at a temperature above the softening point of the polyolefin rubber.

38. The process according to claim 37 wherein the second rubber is not vulcanizable by the vulcanizing agent.

39. The process according to claim 38 wherein the vulcanizing agent is ZnO.

40. The process according to claim 39 wherein a accelerator is included.

41. A process for preparing a thermoplastic composition comprising a polyolefin resin and at least two rubbers comprising:
(a) intimately mixing at least one first rubber selected from the group consisting of halogenated butyl rubber and polychoroprene with at least one second rubber selected from the group consisting of polyisobutylene and ethylene propylene copolymer (EPM) and EPDM at a temperature above the softening points of said rubbers;
(b) adding to the intimate mixture of rubbers a vulcanizing agent which is a vulcanizing agent for at least one first rubber but not for said second rubber;
(c) vulcanizing the rubber by dynamic vulcanization for a time sufficient to fully cure said first rubber; and (d) blending the dynamically vulcanized rubber composition with at least one polyolefin resin at a temperature above the melting point of the resin.

42. The process according to claim 41 wherein the polyolefin resin comprises polypropylene or HDPE.

43. The process according to claim 42 wherein the polyolefin resin comprises a blend of polypropylene with an ethylene copolymer.

44. The process according to claim 43 wherein the ethylene copolymer is an EVA or an ethylene-methylacrylate copolymer.

45. The process according to claim 41 wherein the first rubber is chlorinated butyl rubber.

46. The process according to claim 41 wherein the second rubber is an EPDM.

47. The process according to claim 41 wherein the second rubber is polyisobutylene or an EPM.

48. The composition according to claim 11 wherein the polyolefin resin is a blend of polypropylene and an ethylene copolymer.

49. The composition according to claim 48 wherein the ethylene copolymer is an EVA or an ethylene-methylacrylate copolymer.

* * * * *